(12) United States Patent
Gearing

(10) Patent No.: US 10,808,880 B1
(45) Date of Patent: Oct. 20, 2020

(54) ADAPTER

(71) Applicant: Spartan Precision Equipment Limited, West Sussex (GB)

(72) Inventor: Robert Gearing, Hartfield (GB)

(73) Assignee: Spartan Precision Equipment Limited, West Sussex (GB)

( * ) Notice: Subject to any disclaimer, the term of this patent is extended or adjusted under 35 U.S.C. 154(b) by 0 days.

(21) Appl. No.: 16/428,311

(22) Filed: May 31, 2019

(51) Int. Cl.
*F41A 23/12* (2006.01)
*F16M 11/14* (2006.01)

(52) U.S. Cl.
CPC .............. *F16M 11/14* (2013.01); *F41A 23/12* (2013.01)

(58) Field of Classification Search
CPC .......... F41A 23/12; F41A 23/14; F41A 23/04; F41A 23/08; F41A 23/10; F16M 11/16
See application file for complete search history.

(56) References Cited

U.S. PATENT DOCUMENTS

| | | | |
|---|---|---|---|
| 5,913,668 A | 6/1999 | Messer | |
| 7,845,267 B2* | 12/2010 | Potterfield | F41G 11/004 89/37.04 |
| 2012/0018670 A1 | 1/2012 | Geng et al. | |
| 2015/0204479 A1* | 7/2015 | Bryant | F16M 11/26 348/376 |
| 2019/0113298 A1 | 4/2019 | Fudala et al. | |

* cited by examiner

*Primary Examiner* — J. Woodrow Eldred
(74) *Attorney, Agent, or Firm* — Osha Liang LLP

(57) ABSTRACT

The disclosure relates to an adapter for connecting a firearm to a photographic support, the adapter comprising a body which can be detachably fixed to the photographic support, the adapter further comprising an elongate spigot extending from the body, wherein, in use, the spigot magnetically engages a mounting element fast or integral with the firearm. The disclosure also relates to combinations including an adapter and a photographic support, and/or a firearm.

20 Claims, 6 Drawing Sheets

ADAPTER

BACKGROUND

One or more embodiments disclosed herein relate to the fields of firearms and shooting.

Bipods and tripods are often used by shooters to stably support the front-end of firearms such as rifles, machine guns and air weapons to improve accuracy. Typically, a bipod will clamp to the fore-end of a firearm. Tripods are known including clamps to hold a firearm (e.g. US2019113298), especially about the fore-end of the firearm; or a plate which supports the base of a firearm (e.g. US201218670), optionally on a shooting bag; or a channel which receives and supports a firearm on the tripod (e.g. U.S. Pat. No. 5,913,668).

SUMMARY OF THE DISCLOSURE

According to one or more embodiments of the disclosure, an adapter for connecting a firearm to a photographic support, comprises a body which can be detachably fixed to the photographic support, the adapter further comprising an elongate spigot extending from the body, wherein, in use, the spigot magnetically engages a mounting element which is fast with (e.g. fixed to) or integral with the firearm. The photographic support may be a tripod.

An advantage of the adapter of the disclosure may be that it can be used to mount a firearm stably on a user's existing photographic tripod. Another advantage may be that the attachment to, or detachment from, the firearm is simple and therefore quick to effect.

The body may threadably engage the photographic support. For example, the body may include a threaded portion which engages a correspondingly threaded portion of the photographic support or an element attached, fixed, or otherwise associated with the photographic support. The body may define a threaded aperture which, in use, receives a correspondingly-threaded element of the photographic support.

At least one of the spigot and the mounting element may be magnetic. In one embodiment, the spigot is magnetic, or includes, or is otherwise associated with a magnetic element such as a magnet. In another embodiment both the spigot and the mounting element are magnetic.

At least a portion of the elongate spigot may be movable relative to the body. The spigot may be pivotally mounted in relation to the body.

In one embodiment, the spigot may include a substantially spherical portion which is supported for rotatable movement in relation to the body. The substantially spherical portion may be held within a recess defined by the body. The spherical portion may be held within a cup within such a recess defined by the body. The cup may be made for example of plastics material.

The spigot may be held by an adjustment element, such as a ring. The adjustment element may be rotatably fixed to the body. The adjustment element may be operated between a condition in which the spigot is restrained from movement, and a condition in which the spigot is free to move.

In another embodiment, the spigot may be flexible. One end of the spigot may move. Another end of the spigot may be fixed.

According to another aspect of the disclosure, a combination comprises an adapter according to the disclosure and a photographic support, such as a tripod, the adapter being fixed to the photographic support.

According to another aspect of the disclosure, a combination comprises an adapter and a firearm including a mounting element, fixed or fast to the firearm, or integral with the firearm, in which the spigot of the adapter is magnetically engaged with the mounting element. An advantage of such a combination may be that the firearm is conveniently detachable from the adapter or can be conveniently re-engaged with the adapter.

Such a combination may further include a photographic support, preferably a tripod, the tripod being fixed to the adapter, whereby the firearm is magnetically engaged with the adapter and supported on the tripod. The orientation of the firearm may be altered whilst supported on a tripod. An advantage of such a combination may be that the firearm is stably supported on the tripod. Another advantage of such a combination may be that the firearm may be readily detached from the tripod, for example for shooting the firearm from a different support (such as a shooting bag or barricade) or quickly re-attached.

Locking means of the adapter may hold the firearm in a particular orientation. In one embodiment the adjustment means of the adapter constitutes the locking means.

An adapter in accordance with the disclosure, and combinations of an adapter fitted to a firearm, and a firearm connected by an adapter to a support will now be described, by way of example only, with reference to the accompanying FIGS. 1 to 6, in which.

DESCRIPTION

Figure 1:
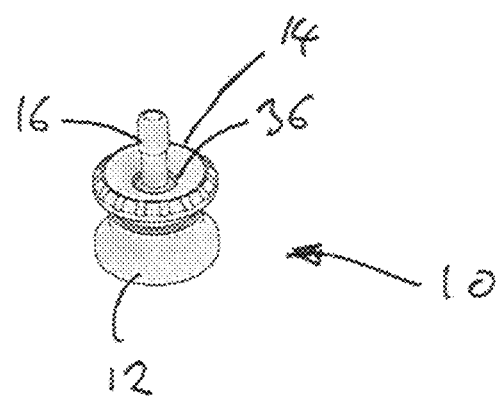
FIG. 1 is a perspective view from above of an adapter in accordance with the disclosure.
Figure 2:
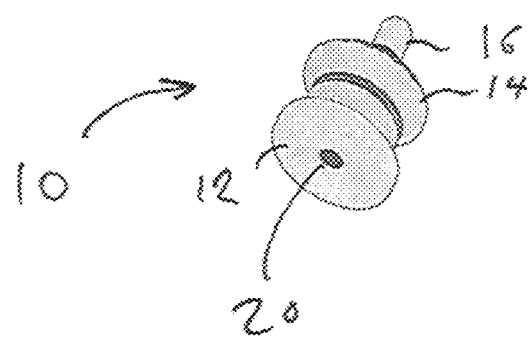
FIG. 2 is a perspective view from below of the adapter of FIG. 1.
Figure 3:
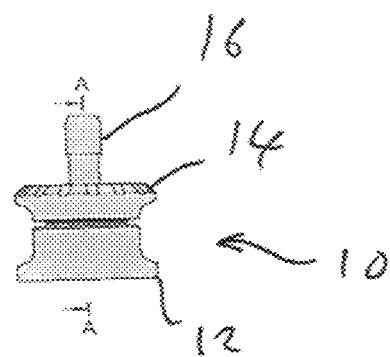
FIG. 3 is an elevation of the adapter of FIG. 1.

An adapter 10 in accordance with the disclosure is shown in FIGS. 1-6. The adapter 10 comprises a body 12, and an adjustment ring 14 threadably mounted on the body 12, and a spigot 16. In one embodiment, one or more of the body 12, adjustment ring 14, and spigot 16 are metallic.

A lower surface 18 of the body 12, defines an aperture 20. The aperture 20 is threaded with a standard thread. In one embodiment, the aperture is threaded ⅜-16 UNC. Such a thread is compatible with standard photographic tripods. However, other threads are contemplated such as ¼-20 UNC, which may be compatible with other photographic tripods.

Figure 4:
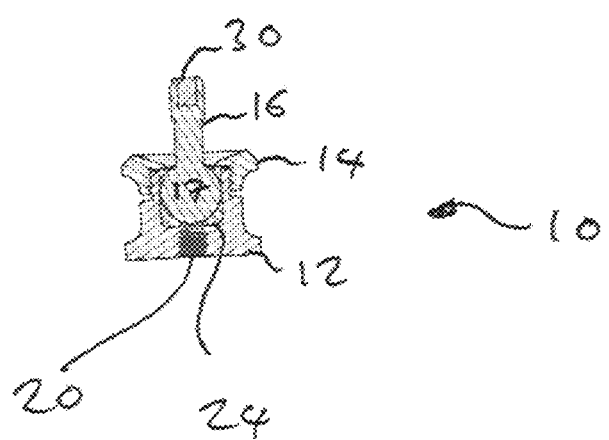
FIG. 4 is a longitudinal cross section of the adapter of FIG. 1 on plane A-A of FIG. 3.

As shown in FIG. 4, the interior of the body 12 defines a recess 20. A plastics material cup 24 is received within the recess. In other embodiments, the cup 24 may be made of another material, for example metallic. A lower portion 17 of the spigot 16 is substantially spherical and sits within the plastic cup 20. An upper portion 26 of the spigot 16 defines a recess 20. A magnet 30 sits within the recess 20. In one embodiment, the magnet 30 is glued within the recess 20. Alternatively, the magnet 30 may be threadably mounted within the recess 20 or a press fit.

The adjustment ring 14 defines a threaded portion 32 which threadably engages a correspondingly threaded portion defined by the body 20. The spigot 16 extends through an aperture 36 defined by the adjustment ring 14. Rotating the adjustment ring 14 downwardly tends to compress the plastic cup which grips the lower portion 17 of the spigot 16 thus inhibiting movement of the spigot 16. In one condition, the adjustment ring 14 is sufficiently tightened so as to prevent movement of the spigot 16.

Conversely, rotating the adjustment ring 14 upwardly tends to release pressure on the plastic cup 24, allowing the lower portion 17 of the spigot 16 to move so that the upper portion of the spigot 16 can be moved from side to side.

The adjustment ring constitutes a locking means for holding a supported firearm in a particular orientation.

A Combination Including an Adapter and a Photographic Support

Figure 5:
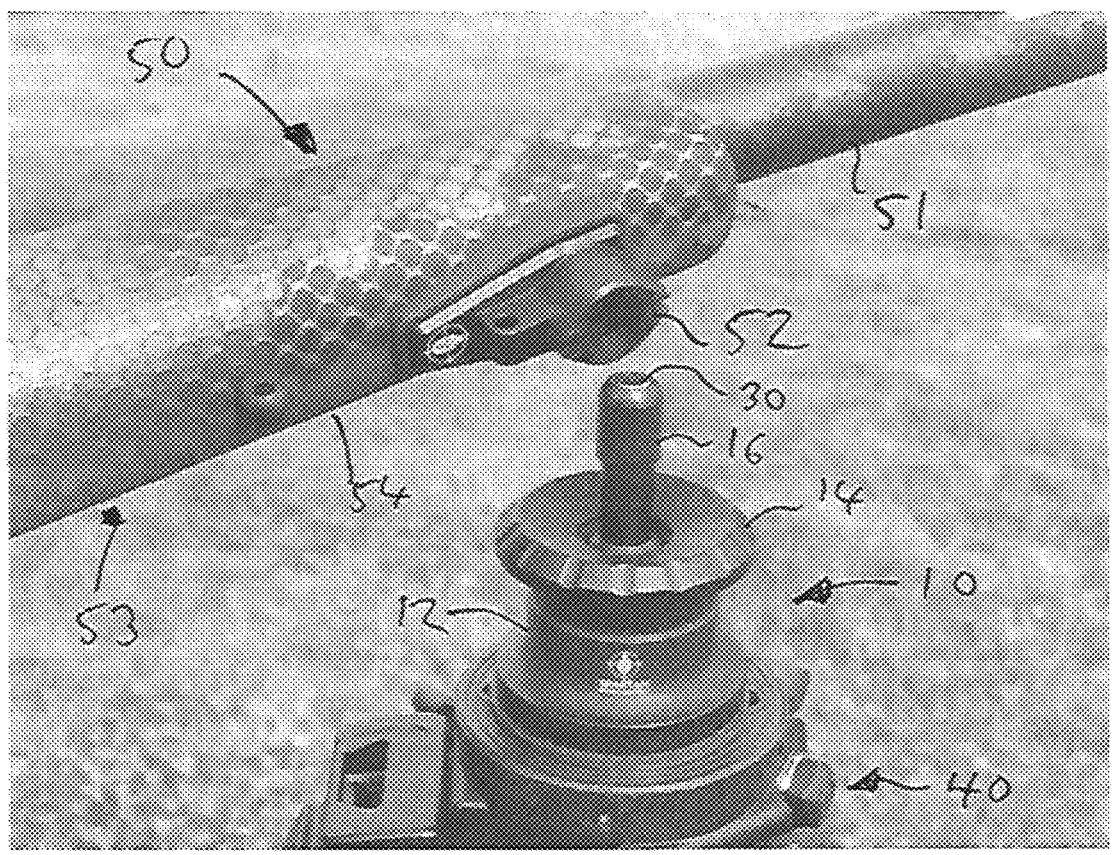
FIG. 5 is a detailed view of a combination of a portion of firearm, and a tripod and an adapter in accordance with the disclosure.
Figure 6:
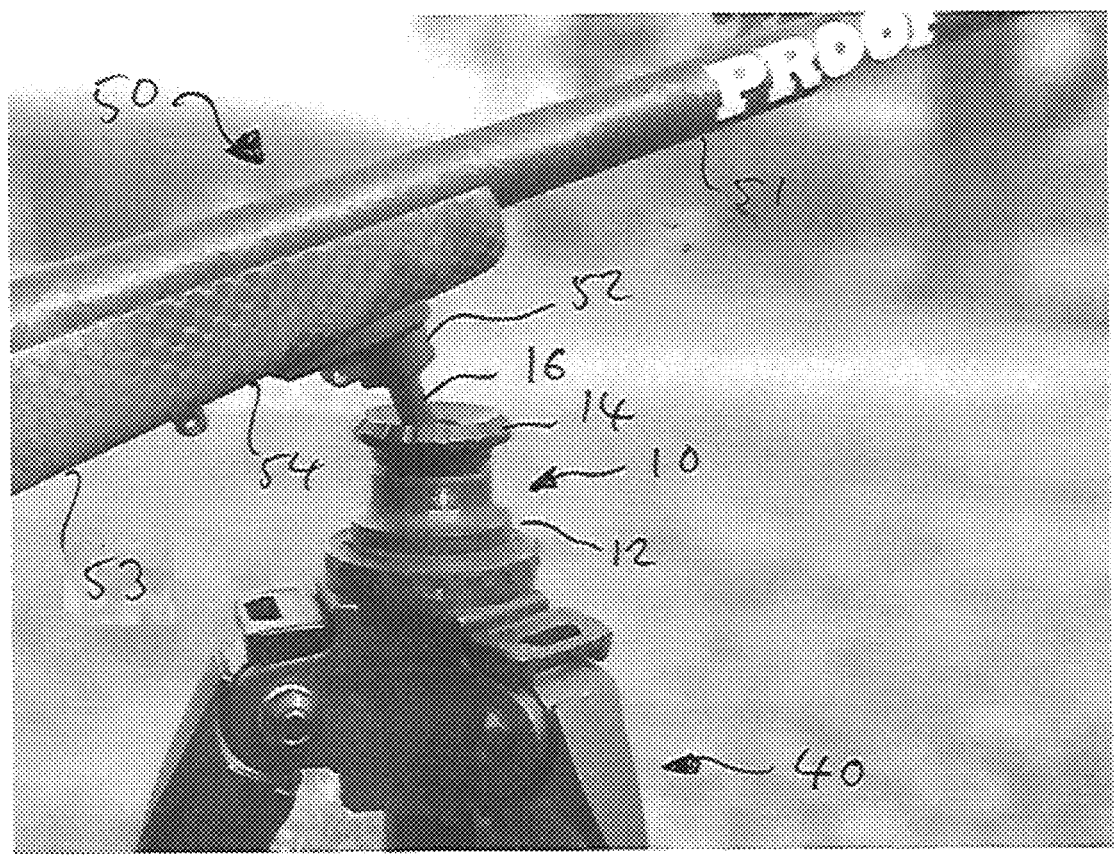
FIG. 6 shows a firearm connected to a tripod by an adapter in accordance with the disclosure.

In use, an adapter 10 is threadably mounted on a conventional male threaded element of a photographic tripod 40, the male element being screwed into aperture 20 of the adapter 10, as shown in FIG. 5. The conventional photographic tripod 40 is of a sturdy construction, as typically used by a professional or semi-professional user. Such tripods provide a particularly stable support for a firearm, when used in combination with an adapter of the disclosure. In the context of the present disclosure, references to a tripod include a support device comprising at least three legs.

The conventional camera body-engaging male threaded element of a photographic tripod 40 (obscured in FIG. 5) would normally engage a camera or optical device. In the context of the present disclosure, the conventional male threaded element is received within aperture 20 of the adapter 10, so that the adapter is screwed down onto the tripod 40 and is held securely thereon. Conversely, the conventional male camera body-engaging threaded element may be screwed up into the aperture 20 of the adapter 10.

A conventional firearm 50, including a barrel 51 and stock 53 is fitted with a metallic mount 52 on the lower surface of fore-end 54 of the stock 53. In one embodiment, the mount 52 is fixed onto a sling swivel stud which is embedded in the fore-end 54. In other embodiments, the mount 52 is bonded to the fore-end 54. In one embodiment, a mount is received within an aperture defined by the fore-end 54 and bonded to the material of the fore-end.

In the embodiment described, the spigot 16 supports a rare earth magnet 30 which magnetically engages to a metallic mount 52 fast with the firearm 50. For example, the mount 52 may be glued, screwed or clamped to the firearm. It will be appreciated by the skilled addressee that the mount 52 might include a further magnet of opposite polarity. Alternatively, the mount 52 might include a magnet which engages the metallic spigot 16 without the need for a magnet on the spigot. In such a case, the mount 52 might itself not be metallic and could be formed from another material.

In use, the firearm 50 may be quickly attached to the tripod 40 by engaging the spigot 16 of the adapter 10 with the mount 52. The magnetic attraction between the magnet 30 and the mount 52 facilitates a quick and simple connection. If the adjustment ring 14 is screwed down, then the firearm will be held in a particular orientation. If the adjustment ring 14 is unscrewed slightly the spigot 16 will be free to move and the orientation of the attached firearm 50 may be adjusted e.g. so that the barrel points up or down or side to side. The adjustment ring 14 may be screwed down again if the shooter wishes to hold the firearm in a chosen orientation. Alternatively, the shooter may leave the firearm free to pan or tilt on the tripod.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. An adapter for connecting a firearm to a photographic support, the adapter comprising a body which can be detachably fixed to the photographic support, the adapter further comprising an elongate spigot extending from the body, wherein, in use, the spigot magnetically engages a mounting element fast with or integral with the firearm.

2. An adapter according to claim 1 in which the photographic support is a tripod.

3. An adapter according to the claim 1, in which the body threadably engages the photographic support or an element of the photographic support.

4. An adapter according to claim 1, in which the body defines a threaded aperture which, in use, receives a correspondingly-threaded element of the photographic support.

5. An adapter according to claim 1 in which at least one of the spigot and the mounting element is magnetic.

6. An adapter according to claim 1, in which at least a portion of the elongate spigot is movable relative to the body.

7. An adapter according to claim 6 in which the spigot is pivotally mounted in relation to the body.

8. An adapter according to claim 6 in which the spigot includes a substantially spherical portion which is mounted for rotatable movement in relation to the body.

9. An adapter according to claim 8 in which the substantially spherical portion is held within a recess defined by the body.

10. An adapter according to claim 9, in which the spherical portion is held within a cup within the recess defined by the body.

11. An adapter according to claim 1 in which the spigot is held against the body.

12. An adapter according to claim 11 in which the spigot is held by an adjustment element.

13. An adapter according to claim 12 in which the adjustment element is rotatably fixed to the body.

14. An adapter according to claim 12 in which the adjustment element can be operated between a condition in which the spigot is restrained from movement, and a condition in which the spigot is free to move.

15. An adapter according to claim 1 in which the spigot is flexible.

16. A combination comprising an adapter according to claim 1 and a photographic tripod, the adapter being fixed to the tripod.

17. A combination comprising an adapter according to claim 1 and a firearm including a mounting element integral with a cast to the firearm, in which the spigot of the adapter is magnetically engaged with the mounting element.

18. A combination comprising an adapter and a firearm according to claim 17, the combination further including a tripod, the tripod being fixed to the adapter, whereby the firearm is magnetically engaged with the adapter and supported on the tripod.

19. A combination according to claim 18 in which the orientation of the firearm may be altered.

20. A combination according to claim 19 including locking means to hold the firearm in a chosen orientation.

* * * * *